United States Patent
Lee et al.

(10) Patent No.: US 9,841,637 B2
(45) Date of Patent: Dec. 12, 2017

(54) DISPLAY PANEL

(71) Applicant: INNOLUX CORPORATION, Chu-Nan, Miao-Li County (TW)

(72) Inventors: Kuan-Feng Lee, Chu-Nan (TW); Peng-Cheng Huang, Chu-Nan (TW); Kuo-Chang Chiang, Chu-Nan (TW); Tzu-Min Yan, Chu-Nan (TW); Kuei-Ling Liu, Chu-Nan (TW)

(73) Assignee: INNOLUX CORPORATION, Jhu-Nan (TW)

( * ) Notice: Subject to any disclaimer, the term of this patent is extended or adjusted under 35 U.S.C. 154(b) by 72 days.

(21) Appl. No.: 14/742,564

(22) Filed: Jun. 17, 2015

(65) Prior Publication Data

US 2016/0178951 A1    Jun. 23, 2016

(30) Foreign Application Priority Data

Dec. 22, 2014 (TW) .............................. 103144794 A

(51) Int. Cl.
*G02B 5/20* (2006.01)
*G02F 1/1339* (2006.01)
*G02F 1/1335* (2006.01)
*G02F 1/1337* (2006.01)

(52) U.S. Cl.
CPC .......... *G02F 1/13394* (2013.01); *G02B 5/201* (2013.01); *G02F 1/133512* (2013.01); *G02F 1/133707* (2013.01)

(58) Field of Classification Search
CPC .......................... G02F 1/13394; G02F 1/1368
See application file for complete search history.

(56) References Cited

U.S. PATENT DOCUMENTS

| | | | |
|---|---|---|---|
| 9,291,869 B2 * | 3/2016 | Hsu ............... | G02F 1/133753 |
| 2002/0003519 A1 * | 1/2002 | Kim ................ | G02F 1/13394 345/87 |
| 2003/0112405 A1 * | 6/2003 | Kim ............... | G02F 1/1339 349/156 |
| 2005/0146658 A1 * | 7/2005 | Kim ............... | G02F 1/133555 349/114 |
| 2006/0017865 A1 * | 1/2006 | Tsubata ........... | G02F 1/133512 349/106 |

(Continued)

FOREIGN PATENT DOCUMENTS

JP    2007-233059    * 9/2007 ........... G02F 1/1339

OTHER PUBLICATIONS

Foreign Office Action issued by the Japan Patent Office, dated Jun. 21, 2016.

*Primary Examiner* — Sang V Nguyen
(74) *Attorney, Agent, or Firm* — Liu & Liu

(57) ABSTRACT

A display panel is provided. The display panel includes a color filter substrate. The color filter substrate includes a first substrate, a black matrix, a color filter layer, a transparent conductive layer, and a plurality of spacers. The black matrix and the color filter layer are disposed on the first substrate. The transparent conductive layer is disposed on the color filter layer and the black matrix, and has a plurality of openings located above the black matrix. The spacers are located on the transparent conductive layer and located on the black matrix. At least one of the openings is located between the adjacent spacers, and at least one of the spacers partially overlaps at least one of the openings.

12 Claims, 5 Drawing Sheets

(56) References Cited

U.S. PATENT DOCUMENTS

| | | | |
|---|---|---|---|
| 2006/0066766 A1* | 3/2006 | Tanaka | G02F 1/13394 349/44 |
| 2006/0081853 A1* | 4/2006 | Jang | G02F 1/13394 257/72 |
| 2007/0278491 A1* | 12/2007 | Liao | G02F 1/13394 257/72 |
| 2010/0103121 A1* | 4/2010 | Kim | G06F 3/044 345/173 |
| 2012/0120337 A1* | 5/2012 | Ji | G02F 1/13394 349/39 |
| 2013/0188117 A1* | 7/2013 | Itou | G02F 1/133377 349/106 |
| 2014/0036189 A1* | 2/2014 | Yi | G02F 1/133512 349/43 |
| 2014/0070350 A1* | 3/2014 | Kim | G06F 3/0412 257/432 |

* cited by examiner

US 9,841,637 B2

DISPLAY PANEL

This application claims the benefit of Taiwan application Serial No. 103144794, filed Dec. 22, 2014, the subject matter of which is incorporated herein by reference.

BACKGROUND OF THE INVENTION

Field of the Invention

The present disclosure is related in general to a display panel, and particularly to a display panel having better display quality.

Description of the Related Art

Liquid crystal displays have been widely applied in a variety of electronic products, such as laptops, tablet PCs, and etc. Moreover, along with the rapid advance of large-sized flat panel displays in the market, liquid crystal displays with light weight and miniaturized sizes have played very important roles and gradually replaced CRT displays to become the main stream in the market.

In addition, liquid crystal displays having wide viewing angles have become the existing trends. However, along with the introduction of wide viewing angle technology, new issues arise as well affecting the display qualities. Therefore, researchers have been working on providing liquid crystal display panels having wide viewing angles.

SUMMARY OF THE INVENTION

The present disclosure is directed to a display panel. In the display panels of the embodiments, the openings of the transparent conductive layer on the color filter substrate are located above the black matrix and partially overlapped with at least a spacer; therefore, the aperture ratio can be effectively increased, the unwanted influence of coupling capacitance on the signal transmission of lines can be decreased, and hence the display quality of the display panel can be improved.

According to an embodiment of the present disclosure, a display panel is provided. The display panel includes a color filter substrate. The color filter substrate includes a first substrate, a black matrix, a color filter layer, a transparent conductive layer, and a plurality of spacers. The black matrix and the color filter layer are disposed on the first substrate. The transparent conductive layer is disposed on the color filter layer and on the black matrix. The transparent conductive layer has a plurality of openings located above the black matrix. The spacers are located on the transparent conductive layer and on the black matrix. At least one of the openings is located between the adjacent spacers. At least one of the spacers partially overlaps at least one of the openings.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1A:
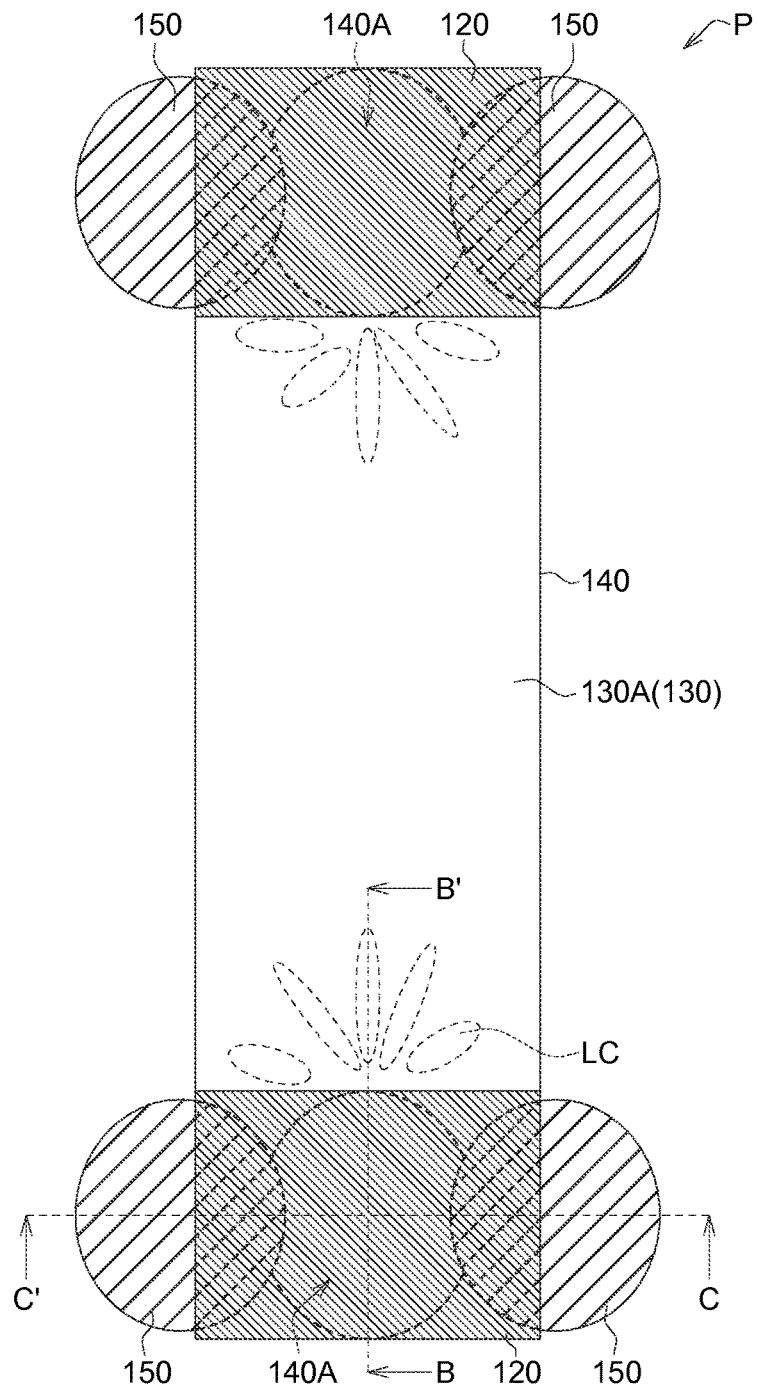
FIG. 1A shows a partial top view of a display panel according to an embodiment of the present disclosure.

According to the embodiments of the present disclosure, in the display panels, the openings of the transparent conductive layer on the color filter substrate are located above the black matrix and partially overlapped with at least a spacer; therefore, the aperture ratio can be effectively increased, the unwanted influence of coupling capacitance on the signal transmission of lines can be decreased, and hence the display quality of the display panel can be improved. The embodiments are described in details with reference to the accompanying drawings. The identical elements of the embodiments are designated with the same or similar reference numerals. Also, it is to be noted that the drawings may be simplified for illustrating the embodiments. Thus, the specification and the drawings are to be regard as an illustrative sense rather than a restrictive sense. The details of the structures of the embodiments are for exemplification only, not for limiting the scope of protection of the disclosure. Detailed structures may be modified or changed by one skilled in the art after having the benefit of this description of the disclosure.

Figure 1B:
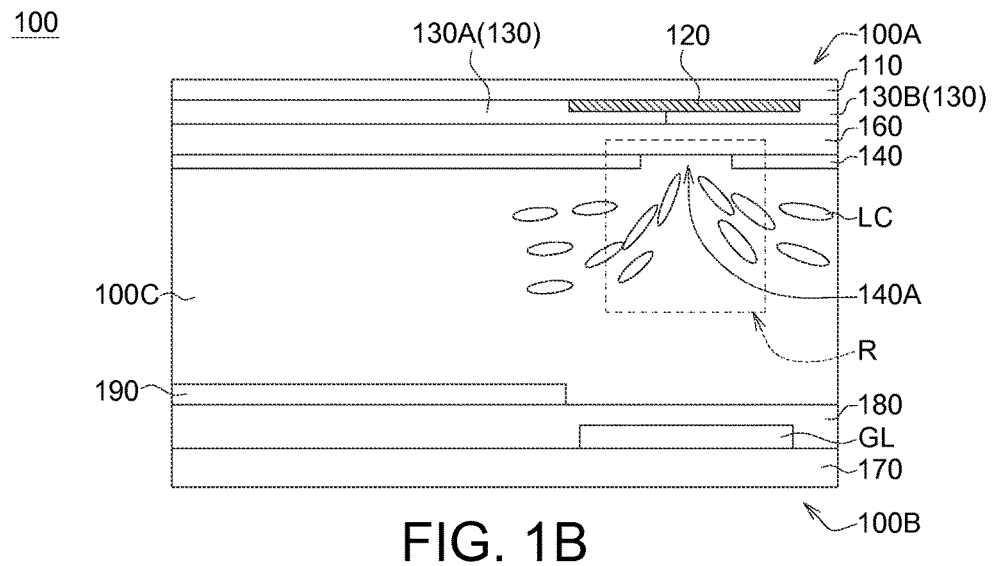
FIG. 1B shows a cross-sectional view along the cross-sectional line 1B-1B' of FIG. 1A.
Figure 1C:
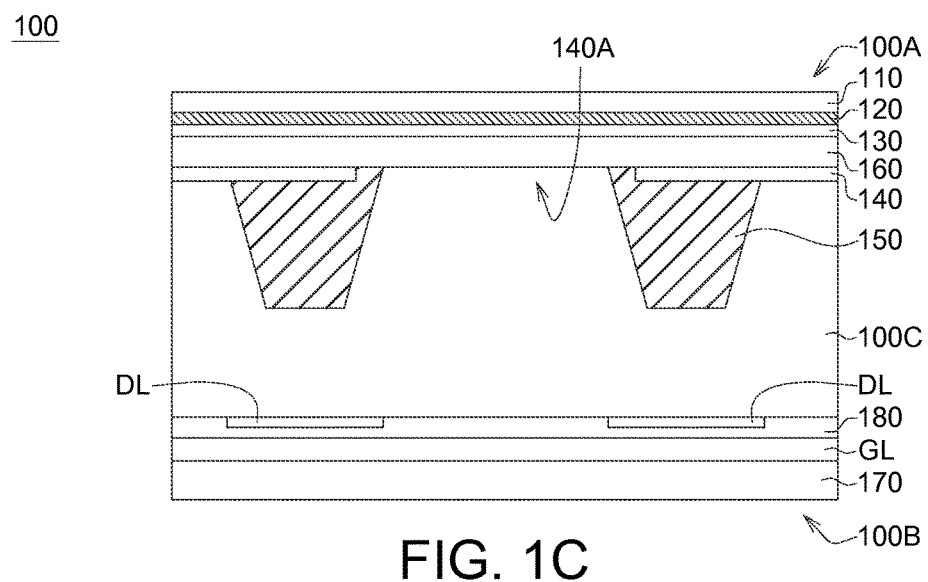
FIG. 1C shows a cross-sectional view along the cross-sectional line 1C-1C' of FIG. 1A.

FIG. 1A shows a partial top view of a display panel 100 according to an embodiment of the present disclosure, FIG. 1B shows a cross-sectional view along the cross-sectional line 1B-1B' of FIG. 1A, and FIG. 1C shows a cross-sectional view along the cross-sectional line 1C-1C' of FIG. 1A. As shown in FIGS. 1A-1C, FIG. 1A shows a sub-pixel unit P of the display panel 100. The display panel 100 includes a color filter substrate 100A, a liquid crystal layer 100C, and a thin film transistor substrate 100B, wherein the thin film transistor substrate 100B is assembled to the color filter substrate 100A for the liquid crystal layer 100C to be disposed therebetween. The color filter substrate 100A includes a first substrate 110, a black matrix 120, a color filter layer 130, a transparent conductive layer 140, and a plurality of spacers 150. In the embodiment, in the structure of the color filter substrate 100A as shown in FIGS. 1A-1C (viewing along the direction from the liquid crystal layer 100C toward the color filter substrate 100A), the black matrix 120 and the color filter layer 130 are disposed on the first substrate 110. Despite the fact that the black matrix 120 is manufactured on the first substrate 110 followed by the formation of the color filter layer 130 overlapping the black matrix 120, as shown in the drawings; however, the present disclosure is not limited thereto. The color filter layer 130 can be manufactured on the first substrate 110 followed by the formation of the black matrix 120 on the color filter 130 as well. The transparent conductive layer 140 is disposed on the color filter layer 130 and on the black matrix 120. The transparent conductive layer 140 has a plurality of openings 140A located above the black matrix 120. The spacers 150 are located on the transparent conductive layer 140 and on the black matrix 120. At least one of the openings 140A is located between the adjacent spacers 150, and at least one of the spacers 150 partially covers at least one of the openings 140A. In other words, at least one opening 140A is located between two adjacent spacers 150, and at least one opening 140A is partially overlapped with at least one of the two adjacent spacers 150.

In other words, as shown in FIGS. 1A-1C, the openings 140A are located above the black matrix 120; that is, the openings 140A of the transparent conductive layer 140 are disposed corresponding to the black matrix 120. In an embodiment, the display panel 100 is such as a liquid crystal display panel, the openings 140A of the transparent conductive layer 140 can induce the liquid crystal molecules in the liquid crystals LC to tilt toward a 360° direction for achieving the effects of wide viewing angles. However, since the arrangements of the liquid crystal molecules in the liquid crystals LC around the openings 140A are irregular, dark regions may appear in the display area if the openings 140A are located in the aperture area (display area) of the sub-pixel unit P, such that light leakage may occur at side viewing angles. Conventionally, to deal with this issue, storage capacitance may be arranged corresponding to the openings 140A for shielding the openings 140A but resulting in the decrease of aperture ratios. While storage capacitance is generated from an insulating layer disposed between two electrode layers, of which at least one is a metal layer, the metal layer being non-transparent can shield lights for solving the problem of light leakage through openings, thereby aperture ratios are influenced. According to the embodiments of the present disclosure, the spacers 150 are located on the transparent conductive layer 140 and on the black matrix 120, that is, the spacers 150 are arranged corresponding to the black matrix 120. As such, the black matrix 120 can provide shielding to the irregular arrangements of the liquid crystal molecules in the liquid crystals LC caused by the shapes of the spacers 150, solving the light leakage problems. In addition, while the openings 140A of the transparent conductive layer 140 are arranged corresponding to the black matrix 120, the black matrix 120 can cover the region R wherein the liquid crystals LC are irregularly arranged around the openings 140A, and such that the issues of dark regions and light leakages regarding the region R where the liquid crystals LC are irregularly arranged can be improved. In other words, according to the embodiments of the present disclosure, the openings 140A of the transparent conductive layer 140 are located above the black matrix 120, such that the arrangement of storage capacitance is not required, the decreased of aperture ratio due to the arrangement of storage capacitance is prevented, and hence the aperture ratio can be effectively increased, the light leakage issues can be effectively prevented, and hence the display quality of the display panel 100 can be improved.

In the embodiment, as shown in FIGS. 1B-1C, the thin film transistor substrate 100B can include a second substrate 170 and a thin film transistor layer 180 disposed on the second substrate 170. The thin film transistor substrate 100B may include a gate line GL. The gate line GL is located in the thin film transistor layer 180 and arranged corresponding to the black matrix 120, as such, the spacers 150 and the openings 140a are also arranged corresponding to the gate line GL. In the embodiment, as shown in FIGS. 1B-1C, at least one of the spacers 150 and at least one of the openings 140A are located on the gate line GL.

In the embodiment, as shown in FIG. 1C, the thin film transistor substrate 100B may further include a data line DL. At least one of the spacers 150 is located on the data line DL.

In addition, as shown in FIG. 1C, according to the embodiments of the present disclosure, at least one of the spacers 150 partially covers at least one of the openings 140A of the transparent conductive layer 140. While the openings 140A of the present embodiment are located above the black matrix 120, the transparent conductive layer 140 having the openings 140A is arranged on the black matrix 120 as well, and a coupling capacitance is generated between the portion of the transparent conductive layer 140 on the black matrix 120 and the gate line GL corresponding to the black matrix, such that issues of signals interference occur. According to the embodiments of the present disclosure, the coupling capacitance can be reduced by decreasing the area of the transparent conductive layer 140 on the black matrix 120 or by increasing the area of the opening 140A, such that the unwanted influence of the coupling capacitance on the signal transmission of lines in the display panel 100 can be decreased.

Moreover, with the increase of pixel-per-inch (ppi) of a display panel, more pixels are required to be arranged in one unit area of the display panel, and thus the size of a unit pixel has to be reduced. Therefore, since the manufacturing methods and materials of the spacers 150 are limited, the sizes of the spacers 150 have minimum limits. While the coupling capacitance between the transparent conductive layer 140 and the gate line GL is reduced by decreasing the area of the transparent conductive layer 140 on the black matrix 120 or by increasing the area of the opening 140A, at least one spacer 150 may be designed to partially cover at least one opening 140A of the transparent conductive layer 140, such that the spacers 150 are allowed to have a relatively larger size, and the openings 140A of the transparent conductive layer 140 may have a relatively larger area as well, which are advantageous to the wide viewing angle effects of the display panel.

In some embodiments, at least one of the spacers 150 covers 5-50% of an area of at least one of the openings 140A. That is, one or many spacers 150 may cover 5-50% of the area of one opening 140A.

In other embodiments, at least one of the spacers 150 covers 10-30% of an area of at least one of the openings 140A. That is, one or many spacers 150 may cover 10-30% of the area of one opening 140A.

In the embodiment, as shown in FIG. 1A, one opening 140A is partially overlapped with two spacers 150. However, the selections of the number of the spacers 150 partially overlapping the openings 140A may vary according to actual needs and are not limited thereto.

In the embodiment, the material of the transparent conductive layer 140 may be such as ITO. However, the selections of the material of the transparent conductive layer 140 may vary according to actual needs and are not limited thereto.

In the embodiment, as shown in FIG. 1B, the color filter layer 130 has at least two color resists 130A, 130B. The color resists 130A and 130B may have the same or different colors. In the embodiment, the color resist 130A and the color resist 130B may be respectively one of a red color resist, a green color resist, or a blue color resist. For example, the color resist 130A is such as a red color resist, and the color resist 130B is such as a green color resist. However, the selections of the color arrangements and the number of the color resists may vary according to actual needs and are limited thereto.

In the embodiment, as shown in FIGS. 1B-1C, the display panel 100 may further include a planarization layer 160. The planarization layer 160 is disposed between the color filter layer 130, the black matrix 120, and the transparent conductive layer 140 located on the color filter layer 130 and the black matrix 120.

In the embodiment, as shown in FIG. 1B, the thin film transistor substrate 100B may include a pixel electrode 190 disposed on the thin film transistor layer 180. In an embodiment, the pixel electrode 190 of the thin film transistor substrate 100B is arranged corresponding to the color resists of the color filter substrate 100A.

In the embodiment, the material of the pixel electrode 190 may be such as ITO. However, the selections of the material of the pixel electrode 190 may vary according to actual needs and are not limited thereto.

Figure 2:
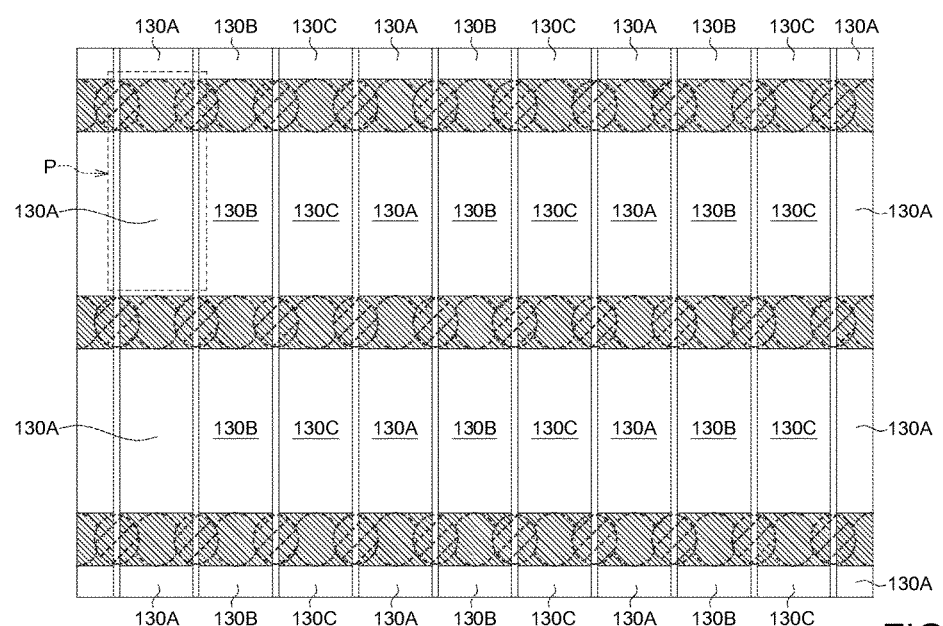
FIG. 2 shows a top view of a display panel according to another embodiment of the present disclosure.

FIG. 2 shows a top view of a display panel 200 according to another embodiment of the present disclosure. The elements in the present embodiment sharing similar or the same labels with those in the previous embodiment are similar or the same elements, and the description of which is omitted.

As shown in FIG. 2, the color filter substrate of the display panel 200 includes a plurality of sub-pixel units P arranged in a matrix. In the embodiment, the color filter layer in the display panel 200 has a plurality of color resists, wherein the color resists arranged in the same column have the same color, and the adjacent color resists arranged in the same row have different colors. For example, in the display panel 200, the color resists in the same column may all be the color resists 130A, the color resists 130B, or the color resists 130C, and the color resists in the same row are arranged by repeating units of color resist 130A/color resist 130B/color resist 130C.

In an embodiment, in the display panel 200, the color resists of the color filter substrate are arranged aligned to the pixel electrodes of the thin film transistor substrate, respectively.

Figure 3A:
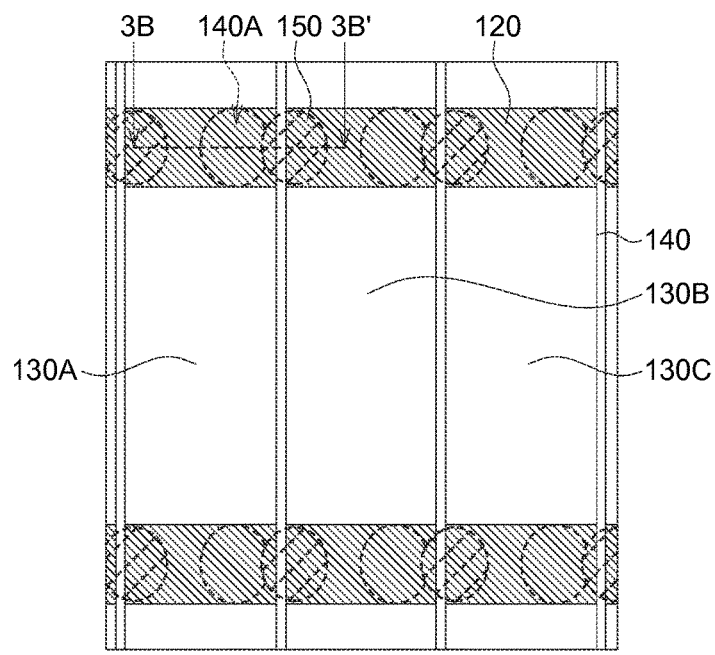
FIG. 3A shows a partial top view of a display panel according to a further embodiment of the present disclosure.
Figure 3B:
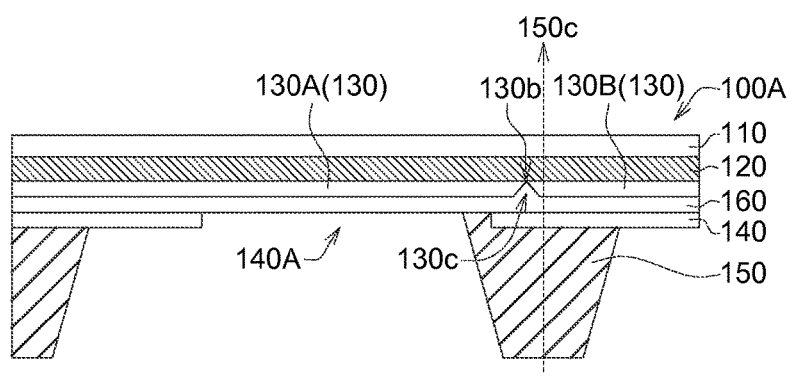
FIG. 3B shows a cross-sectional view along the cross-sectional line 3B-3B' of FIG. 3A.

FIG. 3A shows a partial top view of a display panel 300 according to a further embodiment of the present disclosure, and FIG. 3B shows a cross-sectional view along the cross-sectional line 3B-3B' of FIG. 3A. The elements in the present embodiment sharing similar or the same labels with those in the previous embodiment are similar or the same elements, and the description of which is omitted.

In the embodiment, as shown in FIGS. 3A-3B, the color filter layer 130 has a recess 130c located at the boundary between two color resists 130A and 130B having different colors. The bottom 130b of the recess 130c is located off the center 150c of at least one of the spacers 150. It means the bottom 1130b of the recess 130c is not located at the center 150c of at least one of the spacers 150.

As shown in FIGS. 3A-3B, at least one of the spacers 150 is located on an extension line of the boundary between the two color resists 130A and 130B having different colors. The bottom 130b of the recess 130c is not aligned to the center 150c of the spacer 150. In fact, the bottom 130b of the recess 130c is located off the center 150c of the spacer 150. In other words, the center 150c of the spacer 150 is not exactly located at the boundary between two color resists.

In the present embodiment, as shown in FIGS. 3A-3B, one opening 140A is partially overlapped with one spacer 150.

Figure 4:
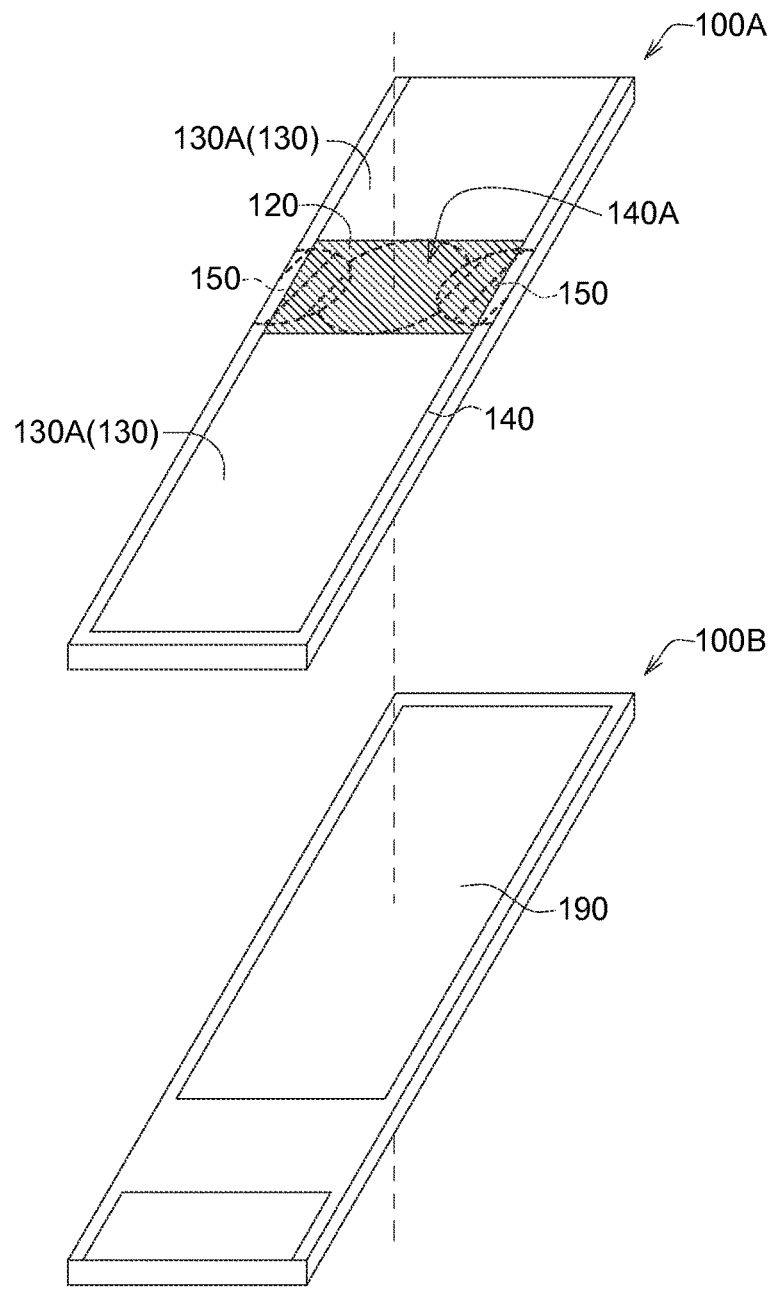
FIG. 4 shows a partial explosion diagram of a display panel according to a still further embodiment of the present disclosure.

FIG. 4 shows a partial explosion diagram of a display panel 400 according to a still further embodiment of the present disclosure The elements in the present embodiment sharing similar or the same labels with those in the previous embodiment are similar or the same elements, and the description of which is omitted.

In the embodiment, at least one of the openings 140A of the transparent conductive layer 140 is located at the center of the pixel electrode 190. As shown in FIG. 4, the opening 140A of the transparent conductive layer 140 of the color filter substrate 100A is corresponding to the center of the pixel electrode 190 of the thin film transistor substrate 100B along an extending direction of the data line DL. In one embodiment, the opening 140A of the transparent conductive layer 140 of the color filter substrate 100A is corresponding to the center of the pixel electrode 190 of the thin film transistor substrate 100B. In other words, the pixel electrode 190 of the thin film transistor substrate 100B is partially overlapped with the color filter layer 130 corresponding to one of the openings exposed by the black matrix 120. That is, the color resist 130A corresponding to one of the openings exposed by the black matrix 120 is arranged misaligned to the pixel electrode 190 of the thin film transistor substrate 100B.

In the embodiment, referring to FIGS. 1A-1C and 4, at least one of the openings 140A and at least one of the spacers 150 are located on the black matrix 120, and the black matrix 120 is arranged across the pixel electrode 190.

According to the embodiments of the present disclosure, referring to FIGS. 1A-1C and 4, the color resist 130A of the color filter substrate 100A is arranged misaligned to the pixel electrode 190 of the thin film transistor substrate 100B, such that the openings 140A located at the color filter substrate 100A side are corresponding to the black matrixes 120 of every sub-pixel units P and are corresponding to the centers or the middle positions of the pixel electrodes 190, that is, the centers or the middle positions of the sub-pixel units P. In the embodiment, as shown in FIG. 4, the black matrix 120 is located between two adjacent color resists 130A of the color filter layer 130 and is corresponding to the center of the pixel electrode 190. Therefore, with such design, the openings 140A of the transparent conductive layer 140 can be corresponding to the centers of the pixel electrodes 190 of the thin film transistor substrate 100B. Accordingly, while the aperture ratio is increased, the display panel can be provided with effects of nice and uniform alignment of liquid crystals.

In an embodiment, the color filter substrate 100A as shown in FIG. 4 can be arranged in a matrix, as shown in FIG. 2. Moreover, units of pixel electrodes 190 of the thin film transistor substrate 100B disposed below the color filter substrate 100A are arranged in a matrix as well, wherein the color resists in the same column have the same color. The color resists and the pixel electrodes 190 in the two matrixes can be arranged misaligned along the column direction, according to the manner as shown in FIG. 4; that is, the color resists and the pixel electrodes are arranged misaligned along the column direction by about half of a sub-pixel unit, for forming a display panel having high aperture ratio and excellent effects of liquid crystal alignments.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display panel, comprising:
  a color filter substrate, comprising:
    a first substrate;
    a color filter layer disposed on the first substrate, the color filter layer having two color resists, wherein the two color resists have different colors, and a recess is formed by the two color resists;
    a transparent conductive layer disposed on the color filter layer, wherein the transparent conductive layer has at least one opening and there is no transparent conductive layer disposed in the at least one opening; and a spacer disposed over the recess, wherein a part of the spacer is located over one of the two color resists, another part of the spacer is located over the other one of the two color resists, a portion of the spacer is disposed in the at least one opening, and another portion of the spacer is disposed on the transparent conductive layer;

wherein at least a portion of the transparent conductor layer is disposed between the spacer and the color filter layer, a width of a bottom part of the spacer is defined as a first width, a width of the recess between the two color resists is defined as a second width, and the first width is greater than the second width.

2. The display panel according to claim 1, wherein the spacer covers 5-50% of an area of the at least one opening.

3. The display panel according to claim 1, wherein the spacer covers 10-30% of an area of the at least one opening.

4. The display panel according to claim 1, wherein the spacer is located on an extension line of a boundary between the two color resists having different colors.

5. The display panel according to claim 4, wherein the bottom of the recess is located off the center of the spacer.

6. The display panel according to claim 4, wherein the two color resists are respectively at least one of a red color resist, a green color resist, or a blue color resist.

7. The display panel according to claim 1, further comprising:

a liquid crystal layer; and
a thin film transistor substrate, wherein the liquid crystal layer is disposed between the thin film transistor substrate and the color filter substrate.

8. The display panel according to claim 7, wherein the thin film transistor substrate comprises a gate line, wherein the spacer and at least one opening are located on the gate line.

9. The display panel according to claim 8, wherein the thin film transistor substrate further comprises a data line, wherein the spacer is located on the data line.

10. The display panel according to claim 7, wherein the color filter substrate further comprises a black matrix disposed on the first substrate, the thin film transistor substrate further comprises a pixel electrode, the spacer is located on the black matrix, and the black matrix and the pixel electrode are overlapping in view of a direction perpendicular to the first substrate.

11. The display panel according to claim 7, wherein the thin film transistor substrate further comprises:

a second substrate; and
a thin film transistor layer disposed on the second substrate.

12. The display panel according to claim 1, wherein the color filter substrate further comprises a black matrix disposed on the first substrate; and a planarization layer located between the color filter layer and the transparent conductive layer.

* * * * *